(12) United States Patent
Sato et al.

(10) Patent No.: US 7,643,986 B2
(45) Date of Patent: Jan. 5, 2010

(54) LANGUAGE TRANSLATION DEVICE, METHOD AND STORAGE MEDIUM FOR TRANSLATING ABBREVIATIONS

(75) Inventors: Naoko Sato, Ebina (JP); Masatoshi Tagawa, Ebina (JP); Michihiro Tamune, Ashigarakami-gun (JP); Atsushi Itoh, Ashigarakami-gun (JP); Hiroshi Masuichi, Ashigarakami-gun (JP); Kiyoshi Tashiro, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 11/213,969

(22) Filed: Aug. 30, 2005

(65) Prior Publication Data
US 2006/0217957 A1    Sep. 28, 2006

(30) Foreign Application Priority Data
Mar. 25, 2005 (JP) ............................. 2005-090232

(51) Int. Cl.
*G06F 17/28* (2006.01)
*G06K 9/34* (2006.01)
*G06K 9/36* (2006.01)
*G06F 17/27* (2006.01)

(52) U.S. Cl. ............................. 704/5; 704/2; 382/176; 382/177

(58) Field of Classification Search ............... 704/1–10, 704/231, 235, 251–257, 261, 270, 276, E13.001–E13.014; 382/100–102, 112–116, 119, 176–180, 181–231
See application file for complete search history.

(56) References Cited

U.S. PATENT DOCUMENTS

| | | | | |
|---|---|---|---|---|
| 4,041,467 A | * | 8/1977 | Cota et al. ................. 715/246 |
| 4,355,370 A | * | 10/1982 | Yanagiuchi .................... 704/6 |
| 4,459,049 A | * | 7/1984 | Howell et al. ................. 400/98 |
| 4,774,666 A | * | 9/1988 | Miyao et al. ................... 704/2 |
| 4,894,779 A | * | 1/1990 | Suzuki et al. .................. 704/2 |
| 5,005,127 A | * | 4/1991 | Kugimiya et al. .............. 704/5 |
| 5,091,876 A | * | 2/1992 | Kumano et al. ................. 704/3 |
| 5,222,160 A | * | 6/1993 | Sakai et al. ................. 382/185 |
| 5,276,616 A | * | 1/1994 | Kuga et al. .................... 704/10 |
| 5,323,316 A | * | 6/1994 | Kadashevich et al. .......... 704/9 |
| 5,418,957 A | * | 5/1995 | Narayan ..................... 717/113 |
| 5,978,754 A | * | 11/1999 | Kumano ........................ 704/3 |
| 6,014,615 A | * | 1/2000 | Chen ............................. 704/3 |
| 6,151,570 A | * | 11/2000 | Fuji ............................. 704/3 |
| 6,226,638 B1 | * | 5/2001 | Okura et al. ................... 707/5 |
| 6,226,792 B1 | * | 5/2001 | Goiffon et al. ............. 717/120 |
| 6,233,546 B1 | * | 5/2001 | Datig ............................ 704/7 |
| 6,496,844 B1 | * | 12/2002 | Hetherington et al. ...... 715/236 |

(Continued)

FOREIGN PATENT DOCUMENTS

JP          A-63-095566          4/1988

(Continued)

*Primary Examiner*—Richemond Dorvil
*Assistant Examiner*—David Kovacek
(74) *Attorney, Agent, or Firm*—Oliff & Berridge, PLC

(57) ABSTRACT

A translation device for translating a document has an image analysis unit and a translation unit. The image analysis unit determines a word and an abbreviation of the word. The translation unit translates the word and generates a new abbreviation based on the translated word.

5 Claims, 7 Drawing Sheets

U.S. PATENT DOCUMENTS

| | | | |
|---|---|---|---|
| 6,631,365 B1 * | 10/2003 | Neal et al. | 707/2 |
| 7,039,867 B1 * | 5/2006 | Scheidig | 715/703 |
| 7,069,207 B2 * | 6/2006 | Corston-Oliver et al. | 704/9 |
| 7,099,876 B1 * | 8/2006 | Hetherington et al. | 707/100 |
| 7,136,876 B1 * | 11/2006 | Adar et al. | 707/104.1 |
| 7,409,333 B2 * | 8/2008 | Wilkinson et al. | 704/2 |
| 2003/0046062 A1 * | 3/2003 | Cartus | 704/10 |
| 2003/0139921 A1 * | 7/2003 | Byrd et al. | 704/10 |
| 2004/0216050 A1 * | 10/2004 | Ono | 715/536 |
| 2005/0160065 A1 * | 7/2005 | Seeman | 707/1 |
| 2007/0010993 A1 * | 1/2007 | Bachenko et al. | 704/9 |

FOREIGN PATENT DOCUMENTS

| | | | |
|---|---|---|---|
| JP | 05054072 A | * | 3/1993 |
| JP | A-10-63666 | | 3/1998 |
| JP | 11066068 A | * | 3/1999 |
| JP | A-2005-11261 | | 1/2005 |

* cited by examiner

FIG. 4

| 店情報 | 海 海産物 | 田 土産 | 菓 菓子 | 営 営業時間 |
|---|---|---|---|---|
| 店舗名 | 住所 | 電話 | 店舗データ | |
| 秋丸商店 | 中央2－2－10 | 23-1376 | 海 | 営10:00-18:00 |
| 竹土産店 | 中央3－1－20 | 23-1027 | 海 田 菓 | 営9:00-17:00 |
| 港シーフードセンター | 中央3－2－11 | 23-5762 | 海 田 菓 | 営9:00-18:00 |
| 鈴木菓子店 | 中央3－2－15 | 23-8872 | 田 菓 | 営10:00-17:00 |
| ⋮ | ⋮ | ⋮ | ⋮ | |

FIG. 5

| ABBREVIATION | WORD | TRANSLATION OF ABBREVIATION | TRANSLATION OF WORD |
|---|---|---|---|
| 海 | 海産物 | M | Marine product |
| 土 | 土産 | S | Souvenir |
| 菓 | 菓子 | C | Confectionery |
| 営 | 営業時間 | B | Business hours |

Shop Information

M Marine Product  S Souvenir  C Confectionery  B Business hours

| shop name | address | telephone | shop date | |
|---|---|---|---|---|
| Akimaru store | chuo 2-2-10 | 23-1376 | M | B 10:00-18:00 |
| Take souvenir shop | chuo 3-1-20 | 23-1027 | M S C | B 9:00-17:00 |
| Minato seafood centre | chuo 3-2-11 | 23-5762 | M S C | B 9:00-18:00 |
| Suzuki confectionery shop | chuo 3-2-15 | 23-8872 | S C | B 10:00-17:00 |
| ⋮ | ⋮ | ⋮ | ⋮ | |

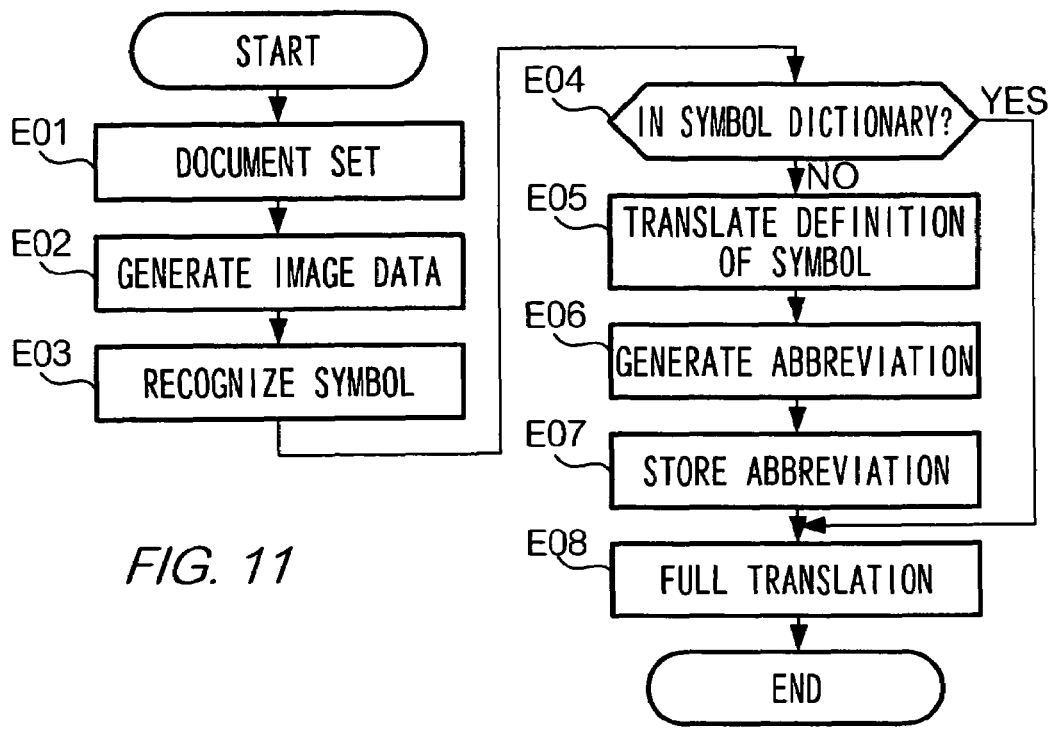

LANGUAGE TRANSLATION DEVICE, METHOD AND STORAGE MEDIUM FOR TRANSLATING ABBREVIATIONS

BACKGROUND OF THE INVENTION

1. Field of the Invention

The present invention relates to a method, a device and a storage medium for translation of a document from one language to another language.

2. Description of the Related Art

The first letter of a word is often used as an abbreviation of the word to make a concise document. FIG. 4 illustrates an example of document using abbreviations. In the example, the line of business of each of a number of shops is expressed using an abbreviation; i.e. the first letters of the names of goods sold, such as '海','土'and '菓'of '海産物(marine product)', '土産'(souvenir)', and '菓子'(confectionary)', respectively, are indicated in a table. An indication of '営業時間'(business hours)' are also denoted using the abbreviation, '営'in the table. Explanatory notes are included in the upper portion of the table, showing the abbreviations together with their definitions. Such abbreviations make the information in the table concise and easy to understand.

Japanese patent publication JP63-95566A discloses a typical document processing scheme using the first letters of words. The document illustrates an address book storing, for each delineated region on a screen indicating a name of prefecture, a name of a city, town, or village, or a name of a person, a key character (the first letter) and its corresponding expression. When a cursor pointer is moved to a desired region on the screen and a key character is input in the region, an expression having the key character as its first letter is displayed in the region.

Translation devices have been developed which input a document written in one language and translate it to another language. However, a translation device using a table such as that illustrated in FIG. 4 encounters difficulties in performing a correct translation. For example, the Japanese word '土産'translates to the English word 'souvenir'. However, the first character '土'of the Japanese word '土産'translates to the English word 'earth'. Accordingly, although the first letter of 'souvenir' is 'S', the abbreviation is rendered as 'E', which is the first letter of 'earth'. Thus, a direct translation of a first character of a Japanese word may lead to a mistranslation of the abbreviation of the word.

SUMMARY OF THE INVENTION

The present invention has been made in view of the above circumstances and provide a translation device. The translation device has an image analysis unit and a translation unit. The image analysis unit determines a word and an abbreviation of the word. The translation unit translates the word and generates a new abbreviation based on the translated word.

BRIEF DESCRIPTION OF THE DRAWINGS

Embodiments of the present invention will be described in detail based on the following figures, wherein:

FIG. 4 illustrates an example of a document using abbreviations of words;

FIG. 5 illustrates an example of an abbreviation dictionary used to translate Japanese to English;

FIG. 10 illustrates an example of an abbreviation dictionary used to translate Japanese to English;

FIG. 11 illustrates an operational flow of translation device 1 according to modification (1); and FIGS. 12A and 12B illustrate typical symbols used in a document.

DETAILED DESCRIPTION OF THE INVENTION

A. Configuration

Translation device 1 is adapted to translate a document to a target language, and is adapted to generate a copy of the document.

Figure 1:
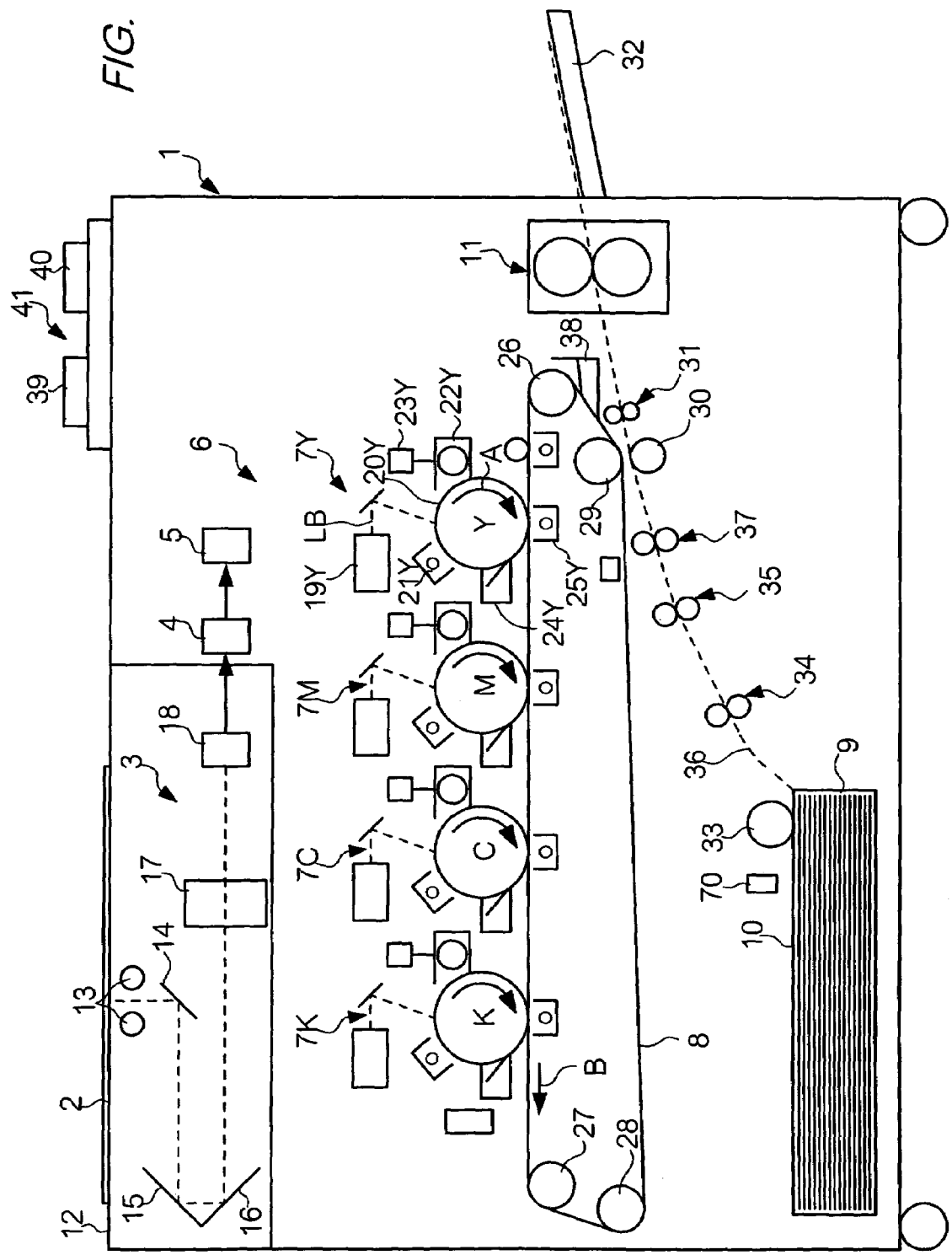
FIG. 1 illustrates a hardware configuration of translation device 1.

FIG. 1 illustrates a hardware configuration of translation device 1. Translation device 1 has a control unit 4. Control unit 4 includes a CPU (Central Processing Unit), a ROM (Read Only Memory), and a RAM (Random Access Memory), which are not shown in FIG. 1. CPU executes OS (Operating System) programs stored in ROM to control components of translation device 1.

Storage unit 5 is non-volatile, and is configured as a hard disk drive unit or the like. Storage unit 5 stores computer programs for performing operations, such as inputting, translating, and outputting a document.

Instruction input unit 41 has a keyboard 40 with a ten keypad and a start button, and has display unit 39 including an LCD panel with a touch panel function. By using instruction input unit 41, a user may input instructions to translation device 1. In case of malfunction of translation device 1, a status of translation device 1 may be displayed at display unit 39.

Sheets 10 adapted to form images thereon are stacked on paper feed tray 9. When an instruction to form images on sheet 10 is input via instruction input unit 41, paper feed roller 33 starts rotating, and feeds sheets 10 one-by-one from paper feed tray 9. Sheet 10 is conveyed along conveyance path 36 by means of paired rollers 34, 35, and 37.

Image input unit 12 inputs a document optically, and generates image data.

Image input unit 12 may be configured as a scanning unit. More specifically, light is radiated from light source 13 onto a document put on platen glass 2. Light from the document is reflected via mirrors 14, 15, and 16 and received by light reception unit 17. Image processing unit 18 converts the reflected light received by light reception unit 17 to electric signals, so as to generate image data consisting of colors of Yellow (Y), Magenta (M), Cyan (C), Black (K).

Image forming unit 6 has image forming mechanisms 7Y, 7M, 7C, and 7K, and a transferring belt 8.

Image forming mechanisms 7Y, 7M, 7C, and 7K each forms toner images of a single color of Yellow, Magenta, Cyan, and Black, respectively. Since these image forming mechanisms have identical configurations, only the details of image forming mechanism 7Y will be described.

Image forming mechanism 7Y includes a photoconductive drum 20Y (image support member), on which an electrostatic latent image is formed, and by which toner image is supported. Image forming mechanism 7Y also includes an electrostatic charging unit 21Y, an exposure unit 19Y, a development unit 22Y, and a cleaning unit 24Y around photoconductive drum 20Y.

Electro-static charging unit 21Y uniformly charges the whole surface of photoconductive drum 20Y to a certain electric potential level of a same polarity, while photoconductive drum 20Y is rotating in a direction of arrow A.

Exposure unit 19Y radiates a beam of light onto the surface of photoconductive drum 20Y in accordance with image data.

Exposure unit 19Y may be configured as a Raster Output Scanner. More specifically, exposure unit 19Y scans a laser beam emitted from a semiconductor laser unit (not shown) in accordance with image data, so as to form an electro-static latent image on the surface of photoconductive drum 20Y. After the laser beam is radiated on an area of the surface of photoconductive drum 20Y, the electric potential level of the area reduces in accordance with the intensity of the laser beam due to photoconductivity of photoconductive drum 20Y. Thus, an electro-static latent image corresponding to the image data is formed on the surface of photoconductive drum 20Y.

Development unit 22Y develops the electro-static latent image formed on the surface of photoconductive drum 20Y. More specifically, toner (electro-statically charged color pigmental material) is charged with the same polarity as the surface of photoconductive drum 20Y. Then, toner is fed from toner tank 23Y to the surface of photoconductive drum 20Y, so as to generate a toner image on the surface of photoconductive drum 20Y. Thus a toner image, which is a negative image of the electrostatic latent image, is formed on the surface of photoconductive drum 20Y.

Transferring belt 8 is hung on rollers 26, 27, 28, and 29, and is driven rotatingly in the direction of arrow B. Transferring belt 8 runs below photoconductive drum 20Y. When photoconductive drum 20Y is pressed against transferring belt 8, the toner image formed on the photoconductive drum 20Y is transferred to transferring belt 8.

Cleaning unit 24Y removes residual toner from photoconductive rum 20Y.

Similarly, in image forming mechanisms 7M, 7C, and 7K, a toner mage of each color is formed on photoconductive drum 20M, 20C, and 20K, respectively. The toner image of each color is overlappingly transferred to transferring belt 8, successively.

Where no distinction is required between image forming mechanisms 7Y, 7M, 7C, 7K, they are simply collectively referred to as image forming mechanism 7. Similarly, where no distinction is required between colors for other components, the notations Y, M, C, and K will also be omitted.

After sheet 10 is fed from paper feed tray 9 on conveyance path 36, sheet 10 enters the nip portion formed between transferring belt 8 and transfer roller 30, and is pressed against transferring belt 8. The pressing force and electro-static suction force from sheet 10 cause the toner image to be transferred onto the surface of sheet 10.

After that, sheet 10 is guided into fusing unit 11 by paired roller 31, fusing unit 11 presses and heats sheet 10 so that the toner is fused on the surface of sheet 10. Thus, an image is formed on sheet 10, and sheet 10 is ejected out to catch tray 32.

B. Functions

Figure 2:
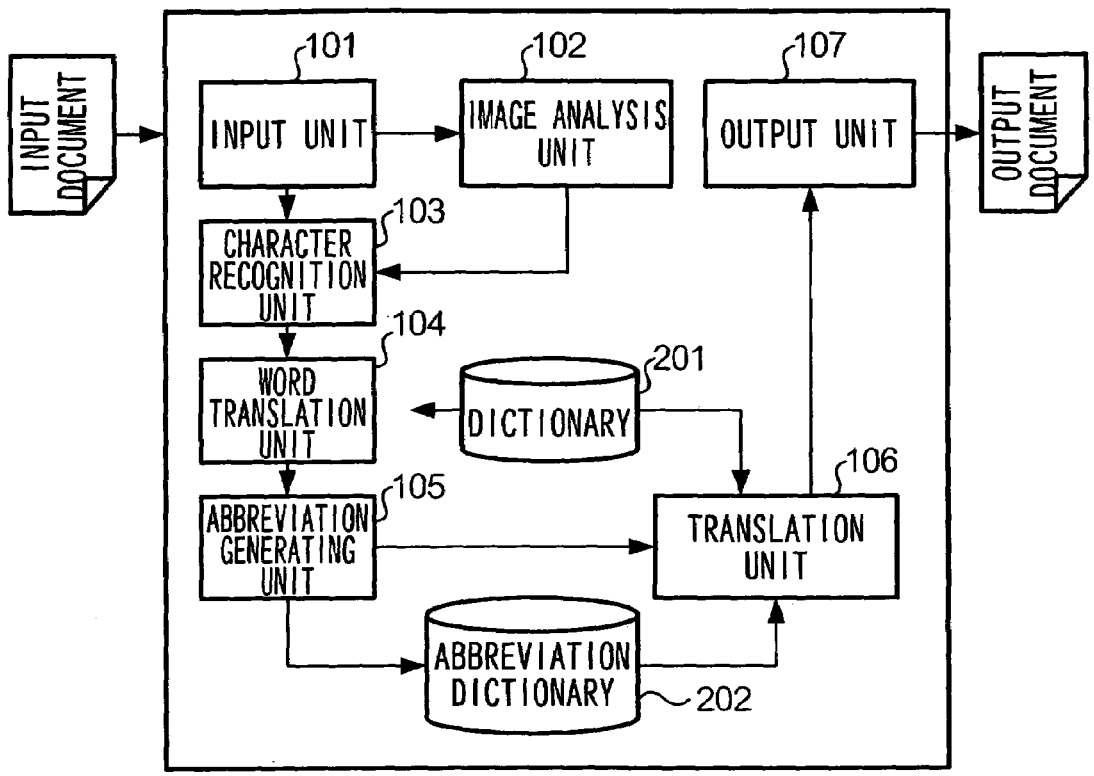
FIG. 2 illustrates a functional block diagram of translation device 1.

FIG. 2 illustrates a functional block diagram of translation device 1. CPU executes programs stored in storage unit 5 to perform translation functions.

Dictionary 201 includes a set of words and their corresponding meanings in a number of languages, and is stored in storage unit 5. In the present embodiment, dictionary 201 may include a set of words in Japanese, English, and Chinese, for example.

Abbreviation dictionary 202 includes a set of: words; abbreviations of the words; translations of the words to other languages; and translations of the abbreviations to other languages, and is stored in storage unit 5. In the present embodiment, abbreviation dictionary 202 may include a set of words, translations of words, abbreviations of words, translations of abbreviations, in Japanese, English, and Chinese for example.

FIG. 5 illustrates an example of abbreviation dictionary 202 for translating Japanese to English. As shown in FIG. 5, the Japanese word '海産品' is abbreviated as the Japanese character '海' by using the first character of the word. An English translation of the word is 'Marine Product'. An English translation of the abbreviation is 'M', from the first letter of the English translation of the word.

In a similar manner, sets including translations of abbreviations are stored for various words in abbreviation dictionary 202 by abbreviation generating unit 105.

Input unit 101 inputs a document by using image input unit 12, and generates image data of the document.

Image analysis unit 102 analyzes the image data to determine an abbreviation definition region in the document. The abbreviation definition region is defined in the present embodiment as the region where explanatory notes are written. In a typical case, the abbreviation definition region is located in an area surrounding a drawing or a table in a document, or at the top or the end portion of a document.

Image analysis unit 102 analyzes layout of a document by using a known layout analysis approach, and determines areas of drawing/table regions or text regions in the document. Image analysis unit 102 then determines, for example, a region adjacent to the drawing/table regions as an abbreviation definition region, where an abbreviation of a word is defined.

In the example of FIG. 4, an abbreviation of a word is put in an open rectangle, in an open circle, or in a pair of parentheses immediately before the word. An abbreviation of a word and the word may be separated with a colon or slash. Image analysis unit 102 determines the region, where abbreviations are described in any one of the above-mentioned manners, as an abbreviation definition region. The region in a document marked by a user with a highlighter or the like may also be determined as an abbreviation definition region.

Character recognition unit 103 recognizes character strings included in a document from image data from input unit 101.

Storage unit 5 stores a known OCR (Optical Character Recognition) program. CPU executes the OCR program and performs the character recognition process.

Word translation unit 104 selects from dictionary 201 a translation of the word recognized by character recognition unit 103 in the abbreviation definition region determined by the image analysis unit.

Abbreviation generating unit 105 generates a translation of abbreviation by selecting the first letter of the translation of the word selected by word translation unit 104. Abbreviation generating unit 105 stores in abbreviation dictionary 202 the translation of the abbreviation generated and the abbreviation recognized in the determined abbreviation definition region by character recognition unit 103.

In the example of FIG. 4, Japanese character '海' in an open rectangle immediately before Japanese word '海産品' is determined to be an abbreviation of the word.

In this example, the translation of the word '海産品' is 'Marine Product'. Accordingly, the first letter 'M' of the translation of the word is selected as the translation of abbreviation. Thus, a set of a word '海産品', an abbreviation of the word '海', a translation of the word 'Marine Product', and a translation of abbreviation 'M' are stored in abbreviation dictionary 202, as illustrated in FIG. 5.

Translation unit 106 generates a full translation of a document from the image data generated by input unit 101 by selecting translations of words from dictionary 201 and selecting translations of abbreviations from abbreviation dictionary 202.

Output unit 107 outputs image data expressing the full translation generated by translation unit 106.

Image forming unit 6 receives the image data output, and forms an image expressing the full translation on the surface of sheet 10. Finally, sheet 10 is ejected out to catch tray 32.

C. Operations

Figure 3:
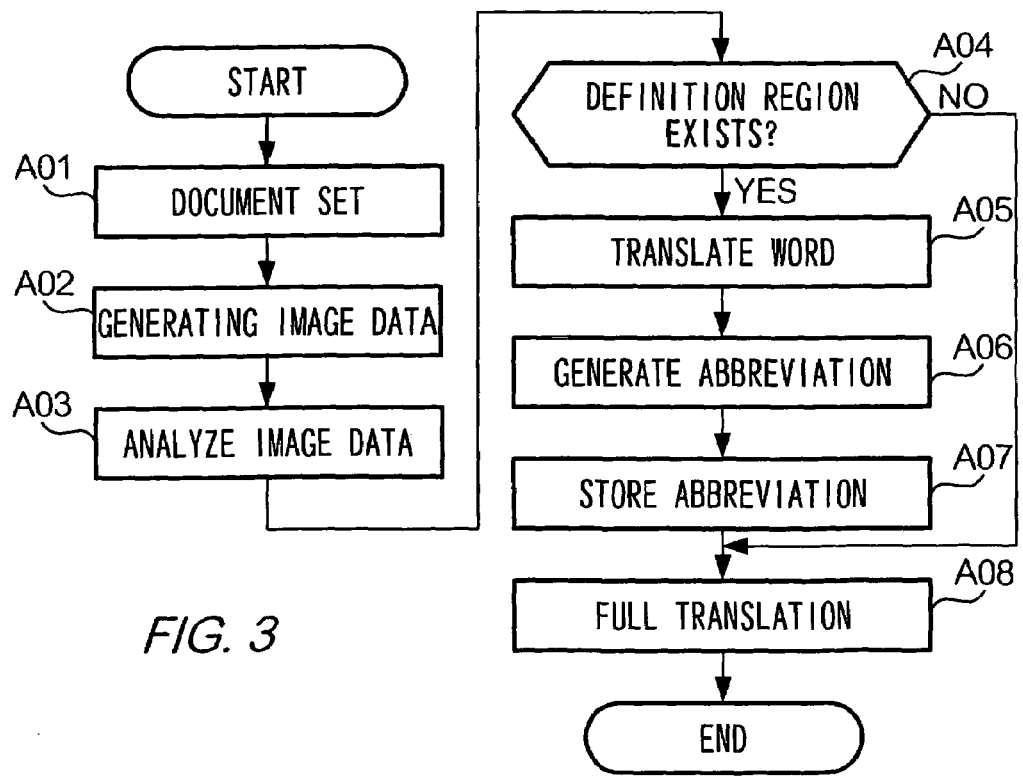
FIG. 3 illustrates an operational flow of translation device 1.

FIG. 3 illustrates an operational flow of translation device 1 according to an embodiment of the present embodiment. FIG. 4 illustrates an example of a document using abbreviations of words.

In step A01, a paper document (referred to hereinafter as a document) is put by a user face down on platen glass 2. A start button is pressed at instruction input unit 41.

In step A02, image input unit 12 generates image data of the document and stores the image data in storage unit 5.

In step A03, CPU analyses image data by using image analysis unit 102, and extracts an abbreviation definition region in the document.

In step A04, CPU determines whether there is an abbreviation definition region. When there is an abbreviation definition region (step A04:YES), CPU advances its operation to step A05, whereas CPU advances its operation to step A08 when there is no abbreviation definition region (step A04: NO).

In the example of FIG. 4, the Japanese character '海' is placed in an open rectangle immediately before the Japanese word '海産品'. The character '海' is the abbreviation and it is the first character of the word '海産品'. Accordingly the region surrounding the character and the word is determined to be an abbreviation definition region. Similarly, the regions each surrounding '土' and '土産', '菓' and '菓子', '営' and '営業時間' are each determined to be abbreviation definition regions. Thus, CPU advances its operation to step A05.

In step A05, CPU recognizes character strings included in the abbreviation definition regions by using character recognition unit 103. CPU selects from dictionary 201 translations of words recognized in the abbreviation definition regions by using word translation unit 104.

In the present example, 'Marine Product' is selected as the translation of the word '海産品'.

In step A06, CPU generates translations of abbreviations by selecting the first letter of the translation of words by using abbreviation generating unit 105.

In the present example, the first letter 'M' of the translation 'Marine Product' is selected as a translation of the abbreviation.

In step A07, CPU stores in abbreviation dictionary 202 a set of a word, a translation of the word, an abbreviation of the word, and the translation of the abbreviation selected in step A06.

In the example of FIG. 5, a set of a word '海産品', an abbreviation of the word '海', a translation of the word 'Marine Product' and a translation of the abbreviation ('M') are stored in abbreviation dictionary 202.

Figures 6, 7:
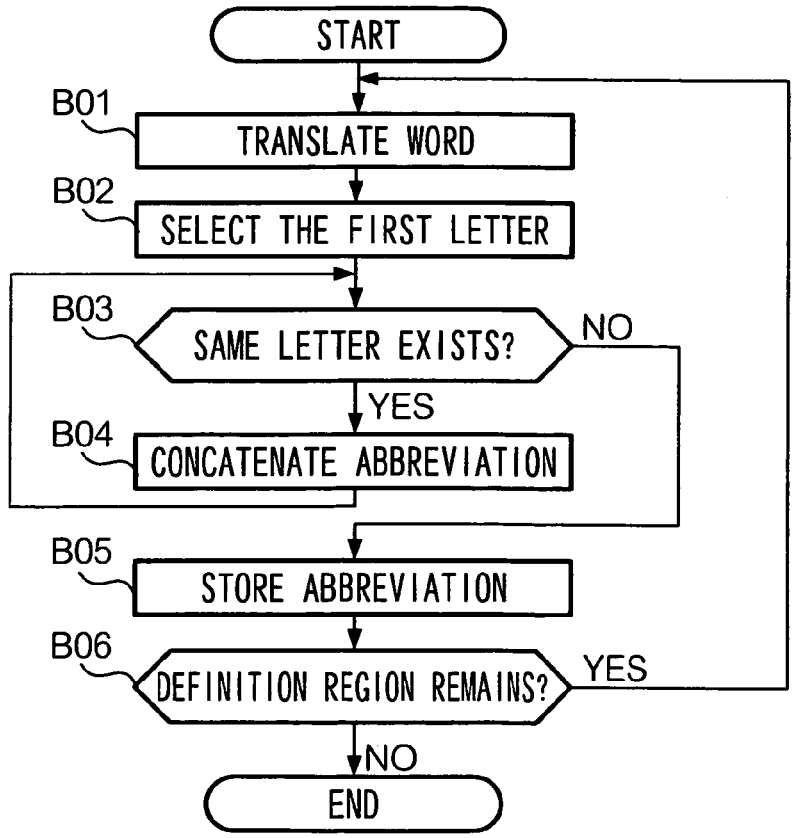
FIG. 6 illustrates a translation of the example of the document shown in FIG. 4.
FIGS. 7 to 9 illustrate operational flows of translation device 1.

In step A08, CPU generates, by using translation unit 106, a full translation of a document from the image data generated by input unit 101 by means of selecting translations of words from dictionary 201 and selecting translations of abbreviations from abbreviation dictionary 202. Accordingly, the full translation is generated as shown in FIG. 6.

CPU outputs image data expressing the full translation. Image forming unit 6 receives the output image data, and forms an image expressing the full translation on the surface of sheet 10. Finally, sheet 10 is ejected out to catch tray 32.

Accordingly, an abbreviation definition region is determined in a document. A translation of an abbreviation of a word is generated by selecting the first letter of a translation of the word. Accordingly, the translation of an abbreviation of a word correctly represents the translation of the word.

D. Handling Collisions in Translating Abbreviations I

The translation of an abbreviation as a single letter is used in the above-mentioned operational flow shown in FIG. 3. Accordingly, collisions occur in translating abbreviations of different words. FIG. 10 illustrates such collisions.

In the present example, the Japanese word '業種' is translated to English term 'Type of Industry', and the Japanese word '交通費' is translated to the English term 'Transportation expenses'. Accordingly, both English translations of abbreviations are 'T' in the operational flow of FIG. 3. Thus, these two translations of abbreviations may not be distinguishable from each other.

FIG. 7 illustrates an operational flow of translation device 1 adapted to handle such collisions in translating abbreviations.

In step B01, CPU selects from dictionary 201 a translation of a word.

In step B02, CPU selects the first letter of the translation selected for the word in step B01.

In step B03, CPU determines if the first letter selected in step S2 is same as a translation of an abbreviation stored in abbreviation dictionary 202. If the first letter is same (step B03:YES), CPU advances its operation to step B04, otherwise (step B03:NO) CPU moves to step B05.

In step B04, to add to the previously selected translation of an abbreviation, the first letter is selected from the second word of the translated term, or the second letter is selected from the first word of the translated term. The selected letter is concatenated to the letter selected in step B02 so as to generate a new translation of an abbreviation. CPU returns its operation to step B03.

In step B03, CPU determines if the new translation of an abbreviation is same as a translation of an abbreviation stored in abbreviation dictionary 202. If the new translation is same (step B03:YES), CPU advances its operation to step B04, otherwise (step B03:NO) CPU moves to step B05.

In step B05, CPU stores in abbreviation dictionary 202 a set of: a word; a translation of the word; an abbreviation of the word; and the translation of the abbreviation.

In step B06, CPU determines whether there remains any abbreviation definition region to be translated. If no region is left (step B06:NO), CPU terminates its operation, otherwise (step B06:YES) CPU returns its operation to step B01.

In the example of FIG. 10, a translation 'T' is generated and stored as an abbreviation for the English translation 'Type of industry' in the first record of abbreviation dictionary 202, whereas a translation 'TE' is generated and stored as an abbreviation for the third record of abbreviation dictionary 202 from the English translation 'Transportation expenses'. Accordingly the two translations of abbreviations may be distinguished from each other.

Accordingly, if a translation of an abbreviation generated is same as a translation of an abbreviation stored in the abbreviation dictionary 202, a new translation of an abbreviation may be generated by including other letters in the new translation of an abbreviation.

E. Handling Collisions in Translating Abbreviations II

Figure 8:
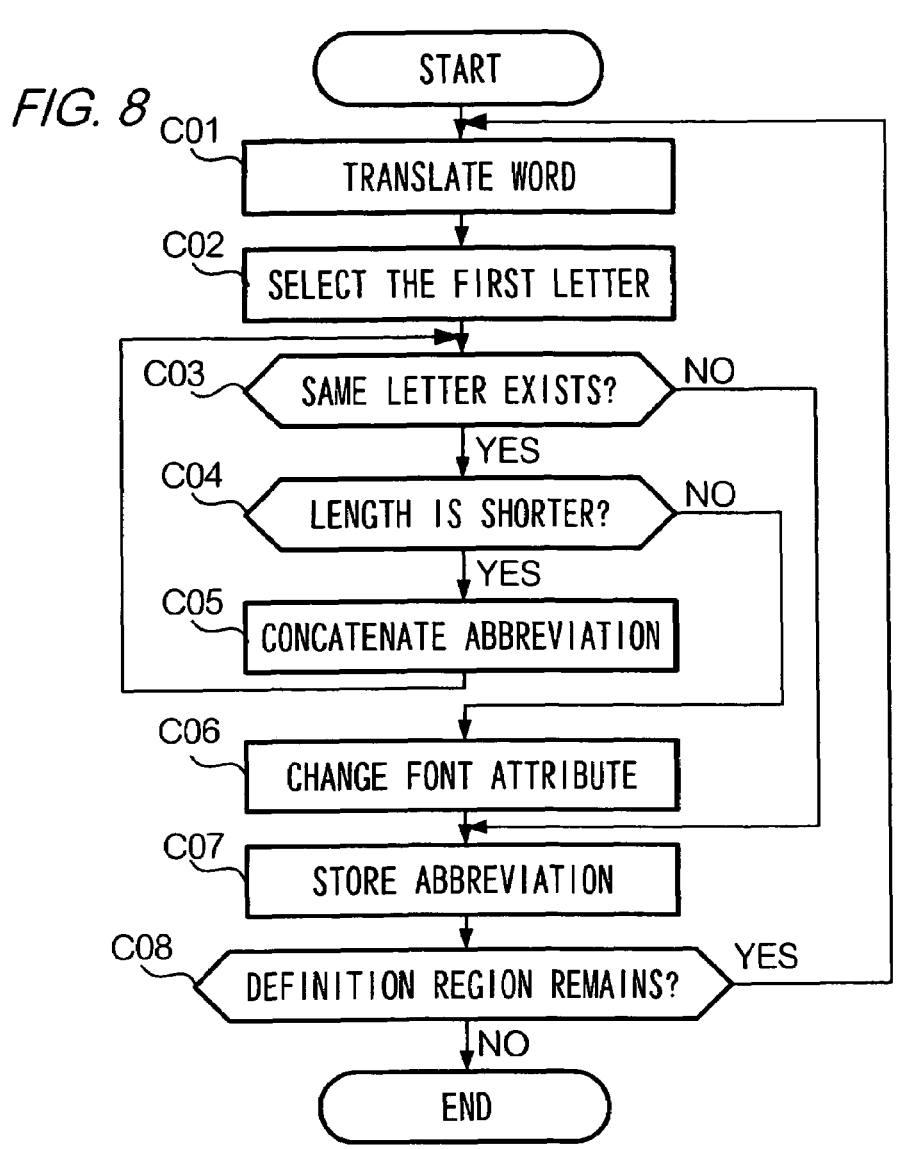

FIG. 8 illustrates another operational flow of translation device 1 adapted to handle collisions in translating abbreviations. In this operational flow, it is assumed that a translation of an abbreviation is adapted to have font attribute.

It is to be noted that the operations in steps C01 to C03, C05, and C07 to C08 are identical to the operations in step B01 to B03, B04 and B05 to B06 in FIG. 7, respectively. Accordingly, details of steps C04 and C06 will be described.

In step C04, CPU determines whether a translation of an abbreviation has at least a prescribed letter length (for example, 2 letters). If the translation of the abbreviation has a shorter length (step C04:YES), CPU advances its operation to step C05, otherwise (step C04:NO) CPU moves to step C06.

In step C06, CPU changes a font attribute of the new translation of an abbreviation or the translation of an abbreviation having a predetermined letter length. More specifically, typeface, character color, or background color may be changed for a new translation of an abbreviation. A new translation of an abbreviation may be put in a rectangle.

In the example of FIG. 10, an identical translation 'T' is generated and stored in the first and the third records of abbreviation dictionary 202 from the English translation of each of 'Type of industry', and 'Transportation expenses'. However, since font attribute of translation 'T' in the third record of abbreviation dictionary 202 differs from font attribute of translation 'T' in the first record, the two translations of abbreviations may be distinguished by the difference in their font attributes.

Accordingly, after a predetermined letter length is reached, only a font attribute is changed for a translation of an abbreviation, and no further concatenation is performed to lengthen the translation of the abbreviation. Thus, a translation of an abbreviation may be kept within a predetermined letter length.

F. Handling Collisions in Translating Abbreviations III

Figure 9:
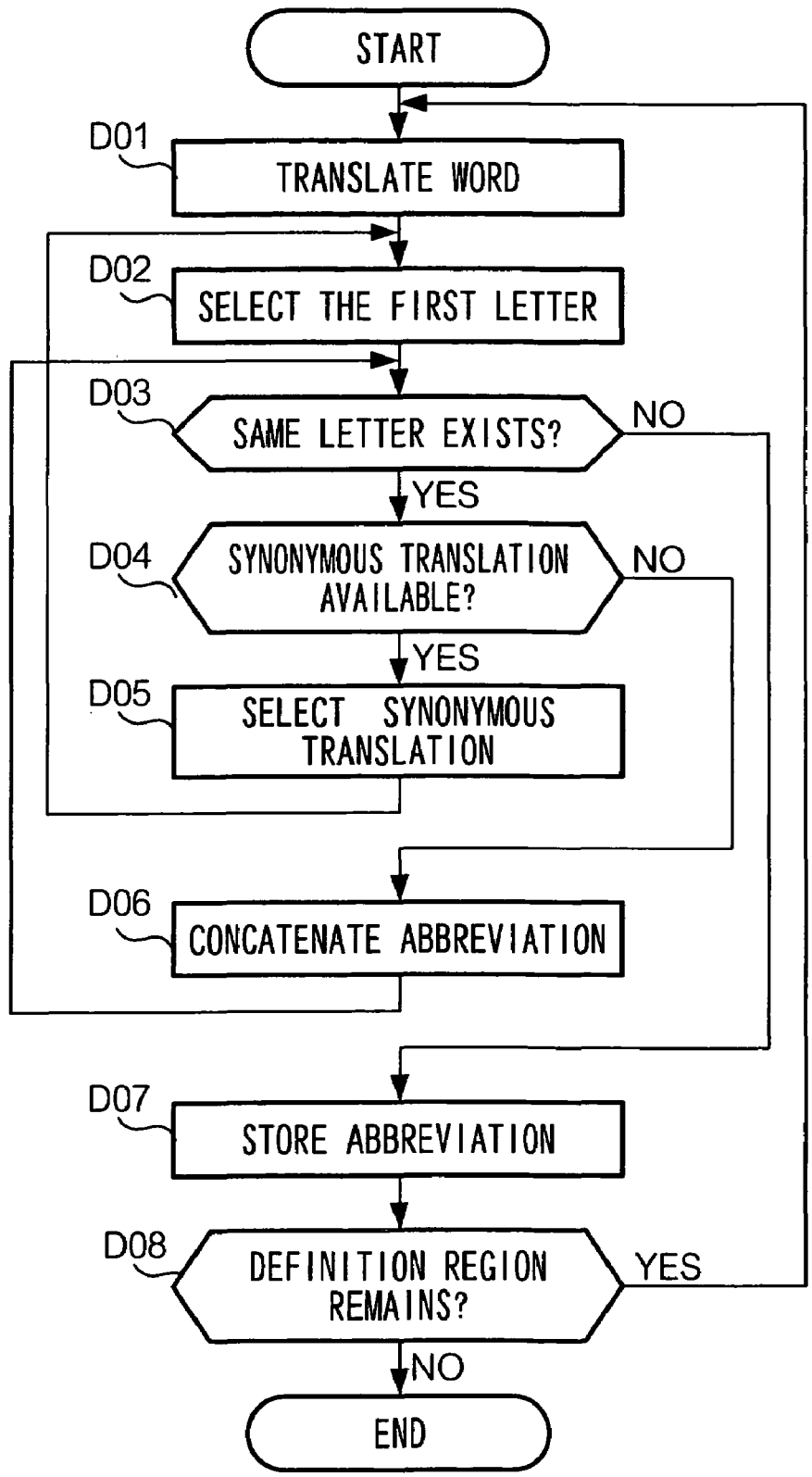

FIG. 9 illustrates another operational flow of translation device 1 adapted to handle collisions in translating abbreviations.

It is to be noted that the operations in steps D01 to D03, D06, and D07 to D08 are identical to the operations in steps B01 to B03, B04 and B05 to B06 in FIG. 7, respectively. Accordingly, details of steps D04 and D05 will be described.

In step D04, CPU determines whether a synonymous translation of a word to be translated is available in dictionary 201. If a synonymous translation of the word is available (step D04:YES), CPU advances its operation to step D05, otherwise (step D04:NO), CPU moves to step D06.

In step D05, CPU selects from dictionary 201 a synonymous translation of the word, replaces the translation of the word with the synonymous translation of the word, and returns its operation to step D02.

In the example of FIG. 10, an identical translation 'T' is generated and stored in the first and the third records of abbreviation dictionary 202 from the English translation of each of 'Type of industry', and 'Transportation expenses'.

However, since a synonymous translation 'Fare' for the word 'Transportation expenses' is available in dictionary 201, a new translation 'F' may be generated by selecting the first letter of the synonymous translation 'Fare'. Thus, the translations 'T' and 'F' may be distinguished from each other.

Accordingly, a new translation of an abbreviation may be generated from a synonymous translation without elongating the translation of the abbreviation.

G. Modifications (1) In place of an abbreviation of a word in the above-mentioned embodiments, symbols may be used in the present invention.

FIG. 12A illustrates typical symbols used in a document. More specifically, a symbol '〒' denotes an indication of postal code, and a symbol '㈱' denotes a joint-stock corporation. FIG. 12B also illustrates typical symbols and their definitions used in a map document.

In the present modification, a set of a symbol and its definition is stored in a symbol dictionary. A translation of a symbol may be generated in a similar manner. The definition stored in the symbol dictionary for a symbol is translated to a target language. Then, the first letter of the translation of the definition is selected as the translation of the symbol.

FIG. 11 illustrates an operational flow according to the present modification.

It is assumed that the fifth symbol in FIG. 12B is used in a document to denote a high school, whereas no symbol denoting a high school is available in the target language.

In step E01, a document is set. In step E02, image data of the document is generated. In step E03, a symbol included in the document is recognized from the image data. In step E04, it is determined the recognized symbol is stored in the symbol dictionary. If the symbol is not stored in the symbol dictionary (step E04:NO), CPU advances its operation to step E05, otherwise (step E04:YES) CPU moves to step E08.

In step E05, the definition of a symbol is translated to the target language. In step E06, a translation of a symbol is generated by selecting the first letter(s) of the translation of the definition of the symbol. In step E07, a set of a symbol and the translation of the symbol generated are stored in the symbol dictionary. In step E08, a full translation of the document is performed, while translations of symbols used in the document are performed by selecting from the symbol dictionary the translations of the symbols.

In the present example, a translation 'HS' is generated for the symbol from the translation of the definition 'high school' to the target language.

(2) Image input unit 12 may be a separate scanning device connected to translation device 1 via a network. Image forming unit 6 may be a separate printing device connected to translation device 1 via a network. The translation device 1 may be provided independently and connected with any other computers to process a document. Also, the document is not limited to a paper document, it may be an electronic document or the like.

As described above, according to an aspect of the present invention, there is provided a translation device. The translation device has a first dictionary storing a set of words and their corresponding meanings in a plurality of languages; an input unit that generates image data from a document; an image analysis unit that determines an abbreviation definition region of the document, by analysing a layout of the document from the image data generated by the input unit, an abbreviation or a symbol of a word being defined being included in the abbreviation definition region; a character recognition unit that recognizes character strings included in the document from the image data generated by the input unit; a word translation unit that selects from the first dictionary a translation of a word included in the abbreviation definition region, an abbreviation of which is determined by the image analysis unit; an abbreviation generating unit that generates a translation of an abbreviation or a symbol by selecting the first letter of the translation of the word selected by the word translation unit; a second dictionary that stores a set of an abbreviation or a symbol and the translation selected for the abbreviation or the symbol by the abbreviation generating unit; and a translation unit that generates a full translation of a document from the image data by selecting translations of words from the first dictionary and selecting translations of abbreviations or symbols from the second dictionary.

According to an aspect of the present invention, there is provided a translation device, having: a first dictionary storing a set of words and their corresponding meanings in a plurality of languages; an input unit for generating image data from a document; an image analysis unit for determining an abbreviation definition region of the document by analysing a layout of the document from the image data generated by the input unit, an abbreviation or a symbol of a word being defined being included in the abbreviation definition region; a character recognition unit for recognising character strings included in the document from the image data generated by the input unit; a word translation unit for selecting from the first dictionary a translation of a word included in the abbreviation definition region, an abbreviation of which is determined by the image analysis unit; an abbreviation generating unit for generating a translation of an abbreviation or a symbol by selecting the first letter of the translation of the word selected by the word translation unit; a second dictionary for storing a set of an abbreviation or a symbol and the translation selected for the abbreviation or the symbol by the abbreviation generating unit; and a translation unit for generating a fill translation of a document from the image data by selecting translations of words from the first dictionary and selecting translations of abbreviations or symbols from the second dictionary.

According to an aspect of the present invention, there is provided a method. the method has: generating image data from a document; determining an abbreviation definition region in the document by analysing a layout of the document from the image data generated, an abbreviation or symbol of a word being defined being included in the abbreviation definition region; recognising character strings included in the document from the image data generated; selecting from a first dictionary a translation of a word included in the abbreviation definition region determined, the first dictionary storing a set of words and their corresponding meanings in a plurality of languages; generating a translation of an abbreviation or a symbol by selecting the first letter of the translation of the word selected; generating a second dictionary, which stores a set of an abbreviation or a symbol and the translation selected for the abbreviation or the symbol; generating a full translation of a document from the image data by selecting translations of words from the first dictionary and selecting translations of abbreviations or symbols from the second dictionary.

According to an aspect of the present invention, there is provided a storage medium readable by a computer. The storage medium stores a program of instructions executable by the computer to perform a function, the function including: generating image data from a document; determining an abbreviation definition region in the document by analysing a layout of the document from the image data generated, an abbreviation or symbol of a word being defined being included in the abbreviation definition region; recognising character strings included in the document from the image data generated; selecting from a first dictionary a translation of a word included in the abbreviation definition region determined, the first dictionary storing a set of words and their corresponding meanings in a plurality of languages; generating a translation of an abbreviation or a symbol by selecting the first letter of the translation of the word selected; generating a second dictionary, which stores a set of an abbreviation or a symbol and the translation selected for the abbreviation or the symbol; and generating a full translation of a document from the image data by selecting translations of words from the first dictionary and selecting translations of abbreviations or symbols from the second dictionary.

Accordingly, an abbreviation definition region in a document is determined from image data of the document; a word in the abbreviation definition region translates to a target language; a translation of abbreviation is generated by selecting the first letter of the translation of the word; the translation of the abbreviation is stored in abbreviation dictionary; and a document is translated while an abbreviation is translated by using the abbreviation dictionary.

Thus, a document using abbreviations of words may be translated correctly.

The foregoing description of the embodiments and modifications of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The disclosure of Japanese Patent Application No. 2005-90232 filed on Mar. 25, 2005, including specification, claims, drawings, and abstract is incorporated by reference in its entirety

What is claimed is:

1. A translation device for translating a document, comprising:
   an image analysis unit that determines a word and an abbreviation of the word; and
   a translation unit that translates the word and generates a new abbreviation based on the translated word,
   wherein when the new abbreviation is used in the already translated part of the document, the translation unit replaces the translated word with a synonym of the word and generates a new abbreviation based on the synonym.

2. A translation method for translating a document comprising:
   determining a word and an abbreviation of the word;
   translating the word; and
   generating a new abbreviation based on the translated word, wherein when the new abbreviation is used in the already translated part of the document, a translation unit replaces the translated word with a synonym of the word and generates a new abbreviation based on the synonym.

3. A storage medium readable by a computer, the storage medium storing a program of instructions executable by the computer to perform a function for translating a document, the function comprising:

determining a word and an abbreviation of the word;

translating the word; and generating a new abbreviation based on the translated word, wherein when the new abbreviation is used in the already translated part of the document and replaces the translated word with a synonym of the word, generating a new abbreviation based on the synonym.

4. A computer implemented translation device, comprising:

a first dictionary storing a set of words and their corresponding meanings in a plurality of languages;

an input unit that generates image data from a document;

an image analysis unit that determines an abbreviation definition region of the document, by analyzing a layout of the document from the image data generated by the input unit, an abbreviation or a symbol of a word being defined being included in the abbreviation definition region;

a character recognition unit that recognizes character strings included in the document from the image data generated by the input unit;

a word translation unit that selects from the first dictionary a translation of a word included in the abbreviation definition region, an abbreviation of which is determined by the image analysis unit;

an abbreviation generating unit that generates a translation of an abbreviation or a symbol by selecting the first letter of the translation of the word selected by the word translation unit;

a second dictionary that stores a set of an abbreviation or a symbol and the translation selected for the abbreviation or the symbol by the abbreviation generating unit; and a translation unit that generates a full translation of a document from the image data by selecting translations of words from the first dictionary and selecting translations of abbreviations or symbols from the second dictionary.

5. A translation device, comprising:

an input unit that inputs a document;

a first dictionary that stores a set of words and the corresponding meanings of the words in a plurality of languages;

a second dictionary that stores a set of words, an abbreviation of each word, a translation of the word, and an abbreviation of the translation of the word; and a translation unit that generates a full translation of the document input by the input unit by selecting translations of words from the first dictionary and selecting translations of abbreviations of the words from the second dictionary.

* * * * *